United States Patent
Alvarez et al.

(10) Patent No.: US 11,138,348 B2
(45) Date of Patent: Oct. 5, 2021

(54) HETEROGENEOUS COMPUTE ARCHITECTURE HARDWARE/SOFTWARE CO-DESIGN FOR AUTONOMOUS DRIVING

(71) Applicant: Intel Corporation, Santa Clara, CA (US)

(72) Inventors: Ignacio Alvarez, Portland, OR (US); Patrick Mead, Santa Clara, CA (US); Carlos Ornelas, Guadalajara (MX); Daniel Lake, Hillsboro, OR (US); Miryam Lomeli Barajas, Tlaquepaque (MX); Victor Palacios Rivera, Guadalajara (MX); Yassir Mosleh, Wilsonville, OR (US); David Arditti Ilitzky, Zapopan (MX); John Tell, Tigard, OR (US); Paul H. Dormitzer, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 70 days.

(21) Appl. No.: 16/155,039

(22) Filed: Oct. 9, 2018

(65) Prior Publication Data
US 2019/0050522 A1    Feb. 14, 2019

(51) Int. Cl.
*G06F 30/15*       (2020.01)
*G06F 30/3323*   (2020.01)
(Continued)

(52) U.S. Cl.
CPC ........... *G06F 30/15* (2020.01); *G05D 1/0088* (2013.01); *G06F 15/17362* (2013.01);
(Continued)

(58) Field of Classification Search
None
See application file for complete search history.

(56) References Cited

U.S. PATENT DOCUMENTS 9,165,196 B2 * 10/2015 Kesavan .............. B60W 10/00
2004/0128416 A1 * 7/2004 Kurts ..................... G06F 1/3215
                                                              710/107
(Continued)

FOREIGN PATENT DOCUMENTS

EP           3637299 A1    4/2020

OTHER PUBLICATIONS

European Search Report received in European Patent Application No. EP 19183090, dated Feb. 11, 2020, 14 pages.
(Continued)

*Primary Examiner* — Farley Abad
*Assistant Examiner* — Dayton Lewis-Taylor
(74) *Attorney, Agent, or Firm* — Spectrum IP Law Group LLC

(57) ABSTRACT

Methods and apparatus relating to heterogeneous compute architecture hardware/software co-design for autonomous driving are described. In one embodiment, a heterogeneous compute architecture for autonomous driving systems (also interchangeably referred to herein as Heterogeneous Compute Architecture or "HCA" for short) integrates scalable heterogeneous processors, flexible networking, benchmarking tools, etc. to enable (e.g., system-level) designers to perform hardware and software co-design. With HCA system engineers can rapidly architect, benchmark, and/or evolve vehicle system architectures for autonomous driving. Other embodiments are also disclosed and claimed.

19 Claims, 14 Drawing Sheets

(51) Int. Cl.
  *G06F 15/173* (2006.01)
  *G05D 1/00* (2006.01)
  *G06F 117/08* (2020.01)

(52) U.S. Cl.
  CPC .................. *G06F 30/3323* (2020.01); *G05D 2201/0213* (2013.01); *G06F 2117/08* (2020.01)

(56) References Cited

U.S. PATENT DOCUMENTS

| | | | | |
|---|---|---|---|---|
| 2011/0010481 | A1* | 1/2011 | Hamadani | G06F 13/4022 710/313 |
| 2011/0255411 | A1* | 10/2011 | Isaac | H04L 12/4625 370/241 |
| 2012/0136501 | A1* | 5/2012 | Gau | H05K 7/1498 700/300 |
| 2016/0288744 | A1* | 10/2016 | Rutherford | H04W 88/10 |
| 2019/0050234 | A1* | 2/2019 | Segal | G06F 1/3228 |

OTHER PUBLICATIONS

Wei Junqing et al., "Towards a Viable Autonomous Driving Research Platform", 2013 IEEE Intelligent Vehicles Symposium(IV), IEEE, Jun. 23, 2013. pages 763-770.

Anonymous, "Intel QuickPath Interconnect", Wikipedia, Jul. 21, 2018, Retrieved from the Internet: URL:https://en.wikipedia.org/w/index.php?title= Intel QuickPath -Interconnect&oldid=849858120, 7 pages.

Steinbach Till et al., "Demo: Real-time Ethernet in-car backbones: First insights into an automotive prototype", 2014 IEEE Vehicular Networking Conference (VNC), IEEE, Dec. 3, 2014, pp. 133-134.

NVIDIA, NVIDIA Announces World's First AI Computer to Make Robotaxis a Reality, https://nvidianews.nvidia.com/news/nvidia-announces-world-s-first-ai-computer-to-make-robotaxis-a-reality, Jun. 27, 2018, 5 pages.

Next-Generation Transportation, "Welcome to the Future of Driving, Making the Autonomous Vision a Reality," https://www.intel.com/content/www/us/en/automotive/automotive-overview.html, Jun. 27, 2018, 4 pages.

Highly Automated Driving Platform, "High-Performance Automotive Prototype ECE with Software and Tools for Efficient Integration of Autonomous Driving Functionality," https://www.renesas.com/en-us/solutions/automotive/adas/solution-kits/highly-automated-driving-plafform.html, Jun. 27, 2018, 2 pages.

Intel Custom Foundry EMIB, "Embedded Multi-Die Interconnect Bridge, A breakthrough in advanced packaging technology," https://www.intel.com/content/www/us/en/foundry/emib.html. Jul. 12, 2018, 10 pages.

Senthilkumar, Designing Multicore ECU architecture in vehicle networks using AUTOSAR, IEEE-ICoAC, 2011, pp. 270-275.

Communication Pursuant to Rule 69 EPC dated Apr. 20, 2020 for EP Patent Application No. 19183090.0.

* cited by examiner

HETEROGENEOUS COMPUTE ARCHITECTURE HARDWARE/SOFTWARE CO-DESIGN FOR AUTONOMOUS DRIVING

FIELD

The present disclosure generally relates to the field of electronics. More particularly, an embodiment relates to heterogeneous compute architecture hardware/software co-design for autonomous driving.

BACKGROUND

Embedded Electronic Control Unit (ECU) systems used in the automotive industry may cover an extensive array of functions associated with vehicle control. For example, ECUs receive electrical signals from one or more sensors, evaluate them, and then calculate triggering signals for mechanical actuators. The proliferation of ECUs has raised concerns regarding manageability of the vehicle distributed system.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
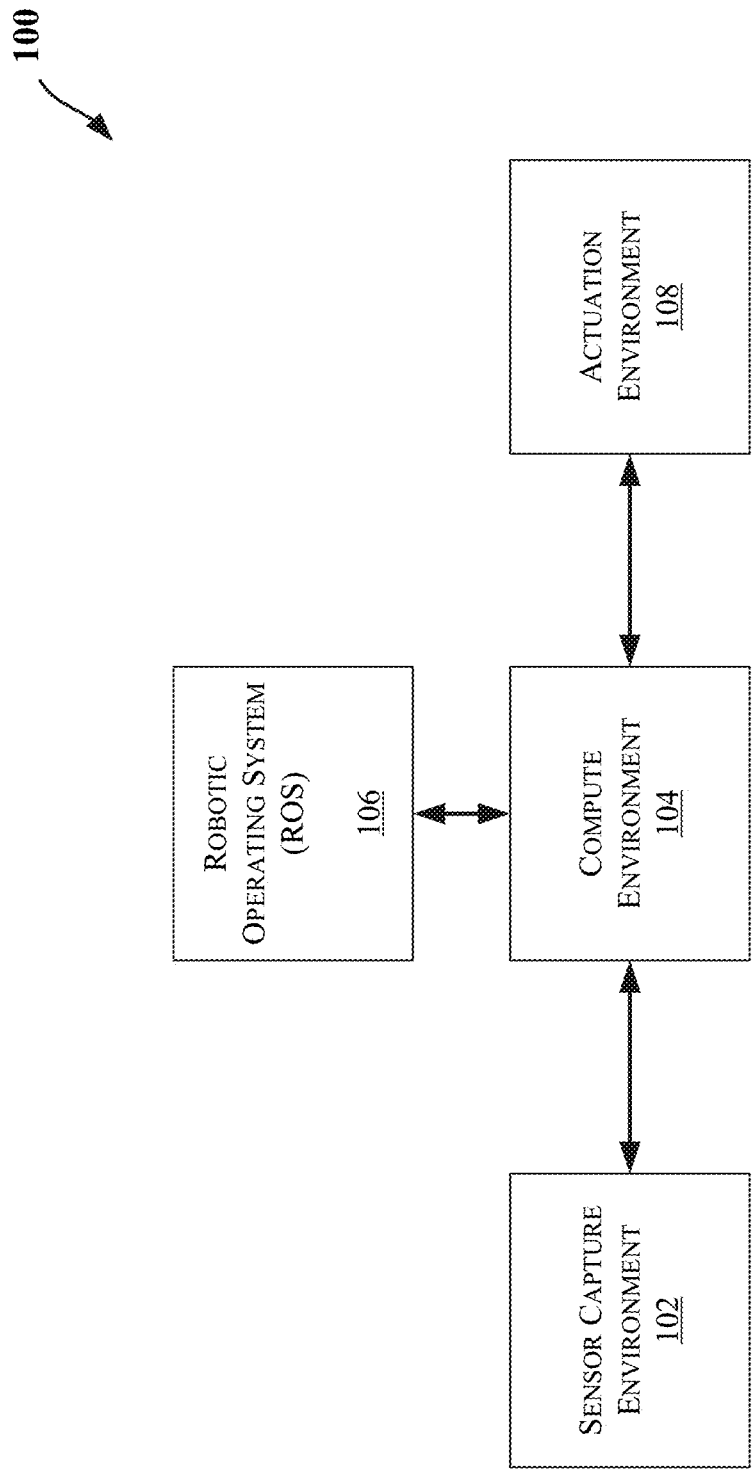
FIG. 1 illustrates various top-level components of a Heterogeneous Compute Architecture (HCA) for hardware/software co-design in autonomous driving, according to an embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, embedded Electronic Control Unit (ECU) systems used in the automotive industry may cover an extensive array of functions associated with vehicle control. For example, ECUs receive electrical signals from one or more sensors, evaluate them, and then calculate triggering signals for mechanical actuators. The proliferation of ECUs has raised concerns regarding manageability of the vehicle distributed system. Thus, consolidating functionality onto fewer ECUs with more powerful processors may be considered. Moreover, some of these ECUs bundle important function groups together such as drivetrain, suspension management system, body, assisted/automated driving, and/or interior/multimedia/telematics domains, which deserve careful consideration.

Compared to traditional software development, the design of embedded systems is even more challenging. In addition to the correct implementation of the functional behavior, one has to also consider non-functional constraints such as real-time behavior, reliability, and energy consumption. For this reason, embedded systems are often built with specialized, often application-specific hardware platforms. To allow late design changes even on the hardware/software partitioning, languages and model-based design tools are required that can generate both hardware and software from the same realization-independent model. Moreover, many embedded systems are used in safety-critical applications where errors can lead to severe damages up to the loss of human lives. For this reason, formal verification is applied in many design flows using different kinds of formal verification methods.

Some embodiments relate to heterogeneous compute architecture hardware/software co-design for autonomous driving. In one embodiment, a heterogeneous compute architecture for autonomous driving systems (also interchangeably referred to herein as Heterogeneous Compute Architecture or "HCA" for short) integrates scalable heterogeneous processors, flexible networking, benchmarking tools, etc. to enable (e.g., system-level) designers to perform hardware and software co-design. With HCA system engineers can rapidly architect, benchmark, and/or evolve vehicle system architectures for autonomous driving.

In an embodiment, HCA utilizes a custom designed motherboard for automotive heterogeneous architecture on which multiple compute elements can be interconnected. This board allows a flexible network architectures of single or multi-core compute units (or processors) using automotive CAN (Controller Area Network), high-speed Ethernet, and/or PCIe (Peripheral Component Interconnect express). HCA may also provide custom designed CPU (Central Processing Unit, or more generically "processor") compute nodes as elements of a scalable heterogeneous vehicle architecture. The CPU compute nodes can be flexibly expanded for acceleration integrating FPGA (Field Programmable Gate Array), GPU (Graphics Processing Unit), or ASIC (Application Specific Integrated Circuit) solutions via PCIe or other interconnects.

In one embodiment, HCA provides a platform for Autonomous Driving System hardware/software co-development which does not exist in any commercial platforms. The hardware flexibility in HCA can be used to speed exploratory vehicle architecture development. The benchmarking toolset can be used to derive informed hardware/software design elements. Further, autonomous driving development has to comply with stringent safety, cost, and power efficiency requirements that can only be achieved with hardware/software co-design. To this end, HCA enables the ability to determine computational performance across multiple processor types as well as benefits or drawbacks of computation acceleration via FPGA, GPU and ASICs versus traditional single-core automotive microcontrollers (ECU), in accordance with one embodiment. With such flexible hardware clustering and networking configurations through Ethernet, Automotive CAN, PCIe, USB (Universal Serial Bus), or JTAG ((Joint Test Action Group (developer of IEEE Standard 1149.1-1990)), automotive system designers can re-architect the complete vehicle electronics using HCA. It is essentially a "car in a box".

Further, the HCA system may provide an ECU board hosting a flexible number of single core traditional automotive microcontrollers, which can be stacked and programmed via CAN, Ethernet, USB (Universal Serial Bus), UART (Universal Asynchronous Receiver-Transmitter), etc. HCA can be considered as a framework for hardware and/or software co-design. To make architectural decisions, management, configuration, and monitoring elements are provided to make informed decisions regarding system architecture for a particular automotive workload, allowing for total flexibility for novel system configurations.

FIG. 1 illustrates various top-level components of a heterogeneous compute architecture 100 for hardware/software co-design in autonomous driving, according to an embodiment. In one embodiment, logic and/or various components (including one or more of the components discussed with reference to FIG. 1) may be mounted or otherwise physically coupled to a vehicle. As discussed herein, a "vehicle" generally refers to any transportation device capable of being operated autonomously (with little or no human/driver intervention), such as an automobile, a truck, a motorcycle, an airplane, a helicopter, a vessel/ship, a train, a drone, etc. whether or not the vehicle is a passenger or commercial vehicle, and regardless of the power source type (such as one or more of: fossil fuel(s), solar energy, electric energy, chemical energy, nuclear energy, etc.) and regardless of the physical state of the power source (e.g., solid, liquid, gaseous, etc.) used to move the vehicle.

Generally, traditional automotive systems tend to rely on a multitude of single-core microprocessors or FGPA-based ECUs. In the current competitive race towards mass adoption of self-driving vehicles, some automakers and technology disruptors may aim to enhance the traditional vehicle infrastructure with an extended suite of sensors and datacenter-like compute capabilities that can be achieved with multiple compute platforms (such as CPUs, GPUs, FPGAs, or specialized ASICs).

Some silicon manufacturers may utilize multicore solutions for autonomous driving, e.g., with GPU based systems to provide a mix of SOC (System On Chip) and MCUs (Microcontroller Units), or CPU based systems with FPGA and/or ASIC acceleration. Hence, while automotive hardware platforms are experiencing a trend toward architectural heterogeneity, modern CPUs can provide flexible hardware resources and rich instruction set for implementing a broad spectrum of compute tasks, specialized workloads, and may motivate the introduction of alternative hardware architectures with specialized circuit design to accelerate operations and parallelism such as the techniques discussed herein with reference to HCA.

In autonomous driving system development, some of the most challenging tasks reside in the simultaneous integration of three critical areas: supercomputing complexity, real-time performance, and functional safety. For example, developers are required to shift their focus from a software-centric approach toward custom hardware/software co-design to produce a system that meets the safety, cost, and power efficiency design constraints of vehicles. None of the current solutions provide the proper ingredients. By contrast, HCA provides supercomputing by enabling a scalable 16× multi CPU/FPGA/GPU/ASIC scalability and the benchmarking software needed to evaluate real-time performance in some embodiments. Also, while certain embodiments may mention a specific number of components/items, embodiments are not limited to these specific numbers, more or less components may be utilized depending on the implementation.

For instance, one main disadvantage of the other solutions is that they may be focused on limited compute types, and the system packaging and available network technologies can render flexible heterogeneous automotive architectures impossible. And, none of the current solutions seem to be applicable to create a heterogeneous environment, allowing proper comparisons between compute types. By contrast, comparisons are generally done as system vs. system where there are too many variables, making isolation of specific design considerations virtually impossible.

Referring to FIG. 1, the HCA components provide a heterogeneous architecture system for Autonomous Driving (AD), engineered to accelerate system level experimentation and benchmarking of AD workloads. It provides researchers/designers access to a "car in a white-box", an integrated, flexible and scalable AD system that can be used as a reconfigurable workstation or embedded platform for in-the-wild testing of vehicle system configurations. HCA is built to speed-up development and optimization of future vehicle architectures, understanding that the current automotive architectures cannot support the compute, connectivity and storage requirements of fully automated driving vehicles. In one embodiment, HCA "in-the wild testing" or embedded integration into a vehicle may be available in engineering vehicles and not suited for production environments. In an embodiment, an HCA ruggedized chassis may include fan cooling rather than liquid cooling solutions and can be apt to evaluate hardware/software configuration and gather initial datasets, and not for prolonged use.

Architecture 100 includes a sensor environment 102, a compute environment 104, a Robotic Operating System (ROS) 106, and an actuation environment 108. These components may be assembled into an enclosure for ease of transport and/or organization. The enclosure may be transparent to allow for quick visual detection, e.g., of indicators. The sensor capture environment 102 includes one or more FPGAs with automotive sensor interface(s). The sensor capture environment 102 may be scalable (e.g., modular), with synchronized and/or flexible sensor(s). For example, each module in the sensor capture environment 102 may include one or more cameras (e.g., 16 High Dynamic Range (HDR) cameras in an embodiment), a Controller Area Network (CAN) bus, and an Ethernet interface. As will be further discussed herein, the compute environment 104 may have a modular design, with each module (also referred to herein as a "region" or "slice" as will be further discussed with reference to FIG. 3B) including one or more processors, e.g., having one or more cores. The processor(s) may run various software program(s) including, for example, a Robotic Operating System (ROS) 106 or components thereof.

The compute environment 104 may include a compute tray (or micro-cluster) provided on a motherboard for several (e.g., 16) compute nodes connected via Ethernet network and CAN with (e.g., 16) reconfigurable PCIe connections for CPU accelerators. The compute environment may utilized one or more different types of processors in various embodiments. For example, multi-core as well as single-core processors may be used.

Actuation environment or test-bed (e.g., ECU Test-Bed) 108 includes a reconfigurable ECU test bed (e.g., including 48 ECUs in CAN network(s)). For example, the test-bed provides a gateway and (e.g., 48) stackable LPC™ cards that contain LPC1000™ family automotive grade microcontrollers (MCUs) networked via automotive CAN bus. Other LPC MCUs may also be used such as LPC800, LPC1100, LPC54000, etc. Each microcontroller includes a processor core, static RAM (Random Access Memory) memory, flash memory, debugging interface, and various peripherals.

In an embodiment, the HCA software architecture includes a middleware layer that provides a set of APIs (Application Program Interfaces) to higher level applications such as a Robotic Operating System (ROS) 106 software stack. The APIs allow for configuring and retrieving data from a multi-modal set of automotive sensors (including for example one or more of: a camera, radar, Light Detection And Ranging (LIDAR) sensor, Inertial Measurement Units (IMUS), etc.). Additionally, the middleware can be designed to abstract the complexity and low level details of the sensor interfaces through the easy to use APIs. The ROS software stack provides a standardized and flexible output which can be leveraged by existing AD algorithms and infrastructure. For example, the ROS 106 may be utilized for object detection, obstacle prediction, trajectory planning, etc. to support AD.

Accordingly, in some embodiments, HCA can provide: (1) a flexible and scalable system with modular hardware components that can be flexibly programmed, configured, and/or networked for particular needs; and/or (2) a reference development and benchmarking platform equipped with workload analysis and reporting tools. HCA's design can address existing limitations of automotive platforms with regards to vehicle electronics, sensor data acquisition. and autonomous driving software development.

Figure 2:
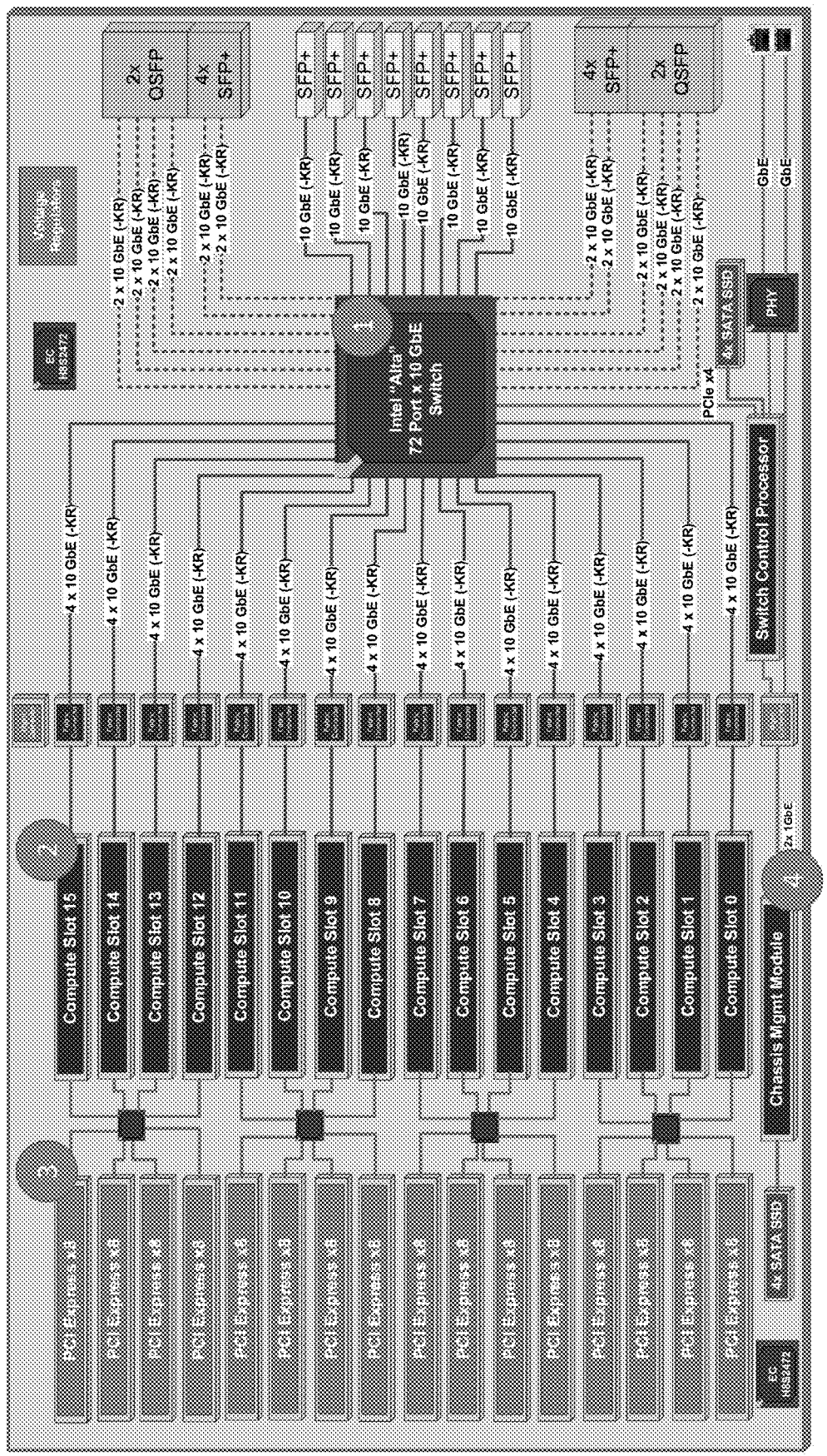
FIG. 2 illustrates a block diagram of a compute environment for HCA, according to an embodiment.

FIG. 2 illustrates a block diagram of a compute environment for HCA, according to an embodiment. As mentioned above, HCA can provide flexible hardware reconfiguration. The compute environment shown in FIG. 2, also referred to herein as a micro-cluster (or ucluster) provides a hardware canvas for configuration of interconnected heterogeneous compute modules. Each of the CPU modules can belong to different microarchitecture families, e.g. Atom® (also called "Denverton™"), Xeon® (also referred to as Broadwell™-DE and SkyLake™-D), or iCore™-7. While various figures or discussions herein may refer to a specific part or device, embodiments are not limited to these specific selections and any other component with the same or similar functionality may be used in various implementations.

The micro-cluster includes an Ethernet switch tray (FIG. 2—item 1) that interconnects through a 10 GB Ethernet switch the 16 CPU compute nodes populated in compute slots (FIG. 2—item 2). Each CPU slot can be extended with peripherals such as FPGA, GPU or other hardware accelerator (e.g., ASIC) via PCI Express (FIG. 2—item 3). The compute board of FIG. 2 has a management network that allows configuration, de/activation of the network, individual component nodes as well as power and I/O management from the Chassis Management Module (CMM) (FIG. 2—item 4). This module provides a high level user program (e.g., CMM) for controlling power, monitoring power use, temperature monitoring, etc. for each compute node or region.

Each compute node can be considered as a full computing server. Any combination of compute nodes can be arranged in a cluster. Each node also has four 10G NIC (Network Interface Controller) connections that couple to the integrated (e.g., 10G) Ethernet switch, a 72 port 10G (e.g., Fulcrum Alta) Ethernet Switch that not only connects all (e.g., 16) nodes, it also has (e.g., eight 10G) back panel connections to couple to a telematics control unit for links to the world outside a vehicle.

Figure 3A:
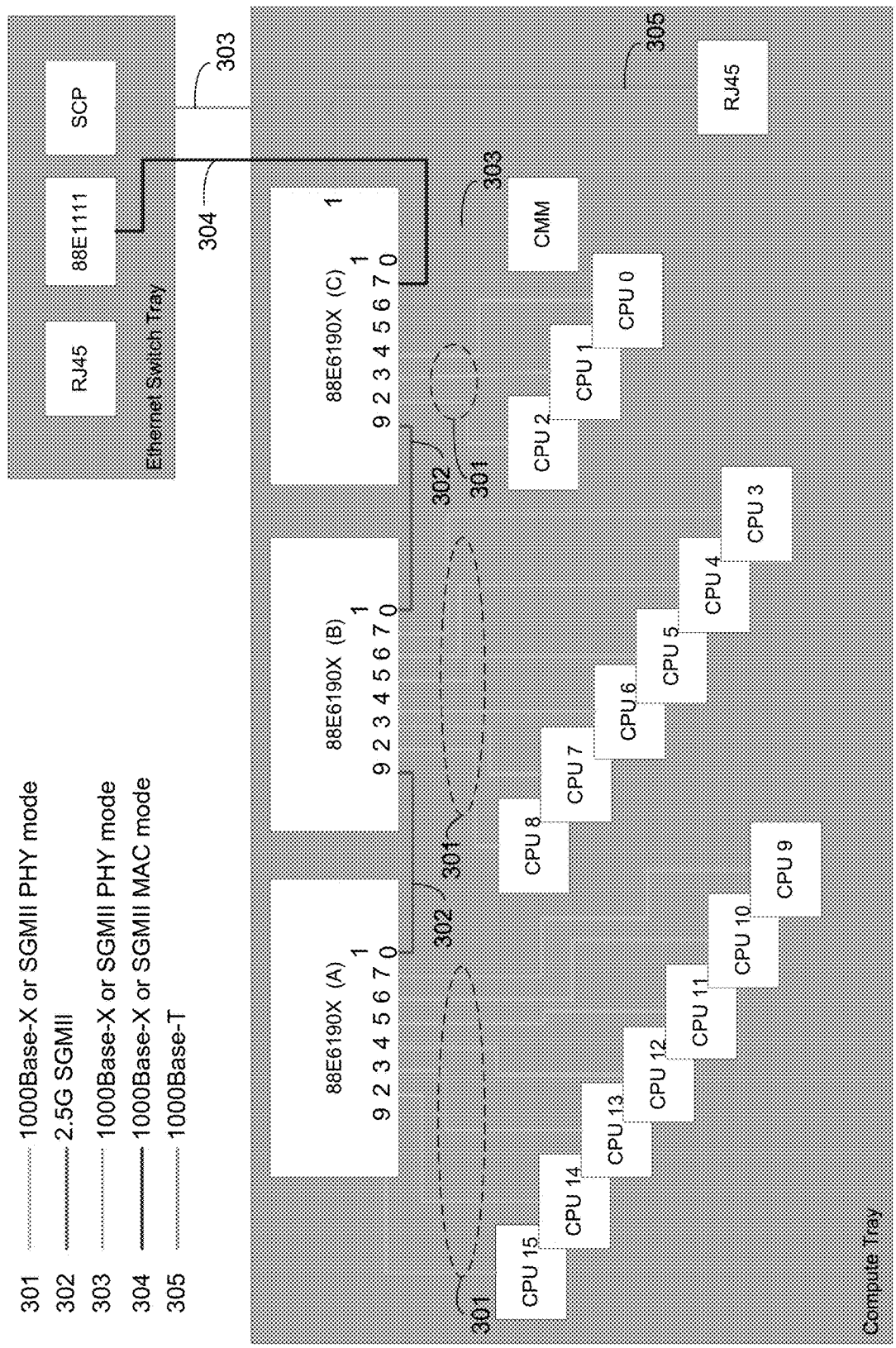
FIG. 3A illustrates a block diagram of a micro-cluster network management module for a HCA, according to an embodiment.

FIG. 3A illustrates a block diagram of a micro-cluster network management module for a HCA, according to an embodiment. An (e.g., 1 GB) Ethernet network may also be added for management use, e.g., using three Marvell 88E190X switches linked as illustrated in FIG. 3A. The management network allows the management module (e.g., CMM) direct access (via high level protocols such as Secure Socket Shell (SSH) and Virtual Network Connection (VNC)) for reconfiguring compute nodes (e.g., via each region controller), e.g., without obstructing or hindering the application network operations.

Figure 3B:
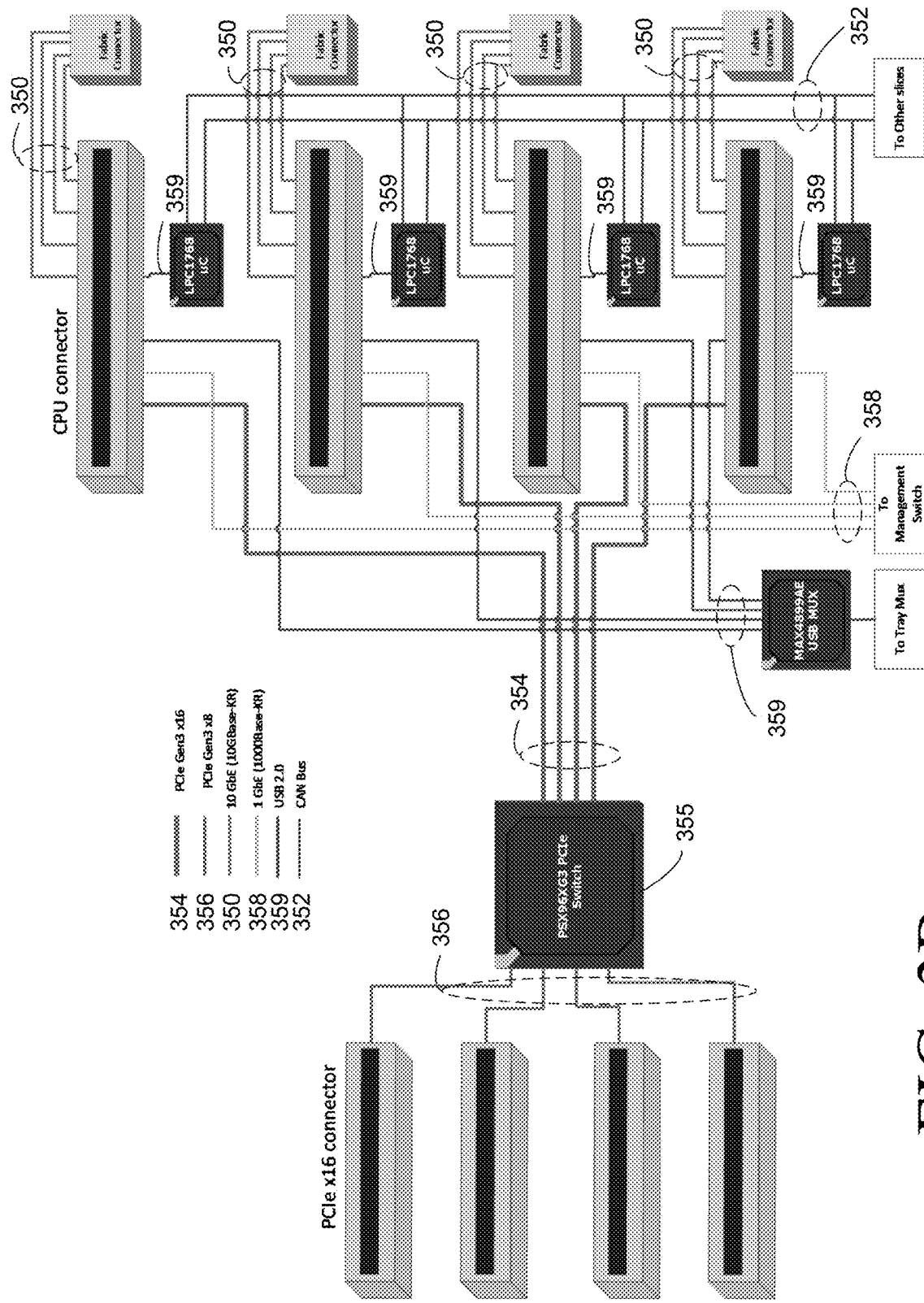
FIGS. 3B, 3C, and 3D illustrate components of micro-cluster data plane slices or regions for HCA, according to some embodiments.

FIG. 3B illustrates a block diagram of a micro-cluster data plane slice or region for HCA, according to one embodiment. More specifically, each set of (e.g., 4) nodes in the compute tray is referred to herein as a "region" (or "slice" interchangeably). In each region, the set of nodes is connected via a PCIe switch to four PCIe slots as illustrated in FIG. 3B.

Moreover, FIG. 3B illustrates how the CPU card connectors route (e.g., four 10 GB) Ethernet connections (350) to the Ethernet switch as well as CAN Bus connections. This allows each of the compute nodes to use a high-speed connection, e.g., to allow the compute nodes to act as a computing cluster to distribute autonomous driving workloads, or as a multi-core individual component communicating via the CAN bus (352) to other vehicle components. The interface to the CAN interface may be provided by an ARM Cortex microcontroller (e.g., LPC1788 or other LPC MCU) via Universal Serial Bus (USB) 359 to each node. Each of the nodes is routed via PCIe 3rd Gen 354 to a PCIe switch 355 that can be configured to connect each of the nodes to each of the PCIe slots/connectors. Each slot may be a mechanical PCIe x16 (but may be electrical x8) 356. With the PCIe Switch, one can assign any of the PCIe slots to any of the CPU nodes/connectors. Each of the nodes has 16 Lanes going to the PCIe switch, if available. Some nodes such as Denverton may have eight PCIe lanes going to the PCIe Switch. Using different CPU nodes in each slot, it makes research easier with the same PCIe peripherals such as FPGA, GPU, or other hardware accelerator (e.g., ASICs) and different CPU architectures. As discussed below, each CPU node architecture may also be very similar to keep results as architecturally specific as possible. This allows users/designers of HCA to truly compare these architectures along with FPGA, GPUs, etc. with their workloads.

Further, by using each type of CPU/compute node or combination of several Atom and/or Xeon nodes, a workload can be run and tested for the node's ability to run that workload with respect to performance and power consumption (e.g., power monitoring may be built into the micro-cluster design). Each CPU node may be designed as a full SOC server equipped with: (a) on-board memory, where the maximum memory depends on the CPU type; (2) M.2 or SSD (or other non-volatile memory) storage, with PCIe x4 and SATA (Serial Advanced Technology Attachment) supported. e.g., on 1 connection; (c) USB connection, e.g., mini 2.0 connector on Broadwell-DE node and USB Type C on newer boards (Broadwell is USB 2. Denverton has USB 2 and USB 3 via the type C, and newer such as Skylake are USB 3.1); (d) debug connector, which provides a PCIe (e.g., x1) and serial port to a special debug board (which can use a mini HDMI (High Definition Multimedia Interface) to HDMI cable); and/or (e) firmware/debug headers, which may have MIPI60, Dediprog™ (for BIOS (Basic Input Output System)), and EC to program the H8S microcontroller (for powering up a node).

Figure 3C:
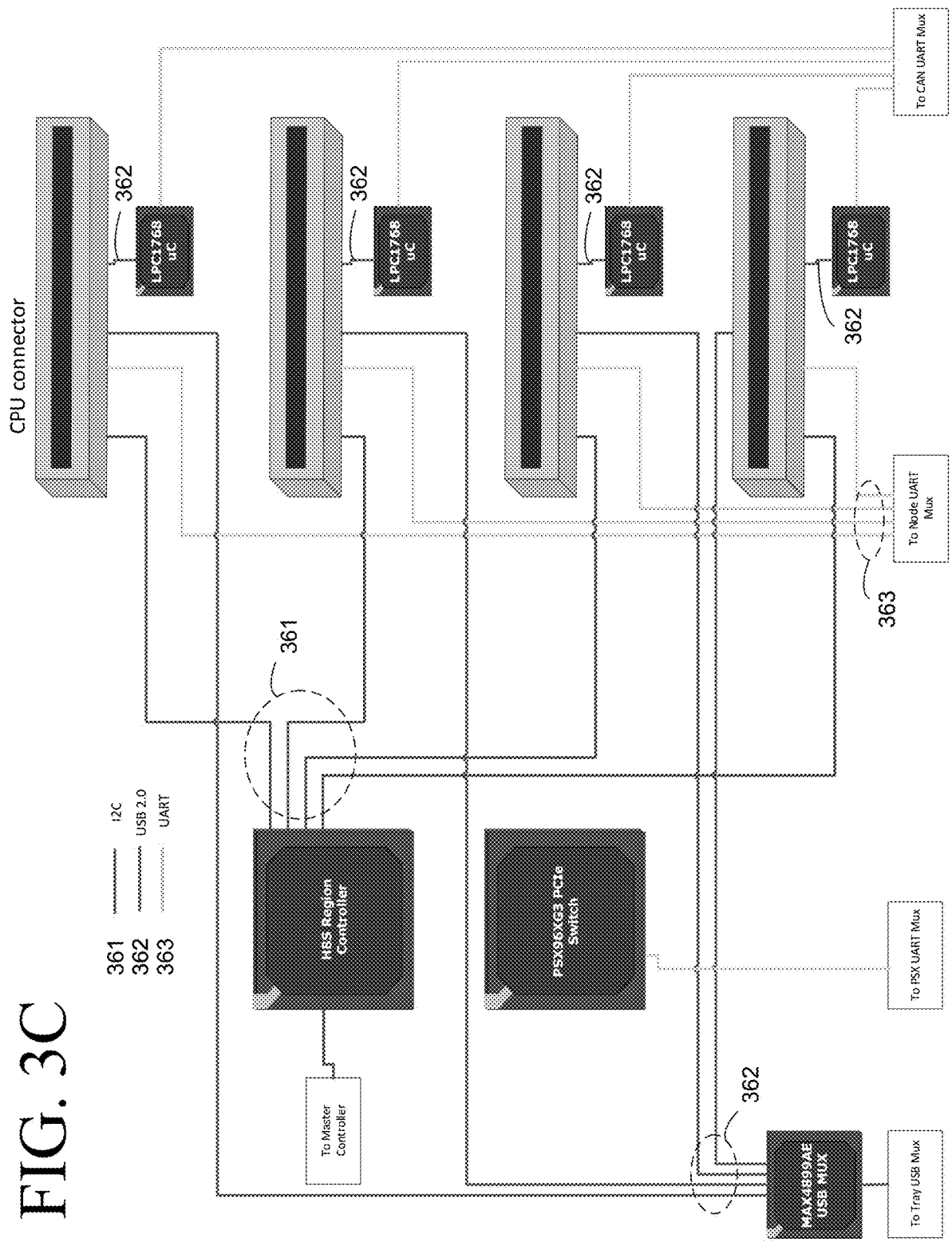

Additionally, in some embodiments, each node may include the following connections: (i) PCIe, e.g., 16 PCIe lanes to the PCIe switch and then to PCIe slots (see, for example, region description above); (ii) CAN bus with USB to an LPC1768 CAN bus controller giving access to two CAN buses that run between all nodes with front panel and mid board connectors (e.g., M.12); (iii) 10G Network, such as 4×10G connections to the Ethernet switch tray (e.g., 72 port 10G switch), where some nodes may have less connections such as Broadwell-DE that may have two; (iv) management LAN (Local Area Network), e.g., a 1G connection between all nodes, the CMM, and SCP (Secure Copy) for using SSH and other connections between nodes separate from the 10G LAN; (v) UART (Universal Asynchronous Receiver-Transmitter) and I2C (Interface to Communicate), for use in powering on a node, programming firmware, and debug, where these connections go back to the CMM as illustrated in FIG. 3C. It is not expected that firmware will need updating but if it does it can be done via the CMM program on the CMM module.

Figure 3D:
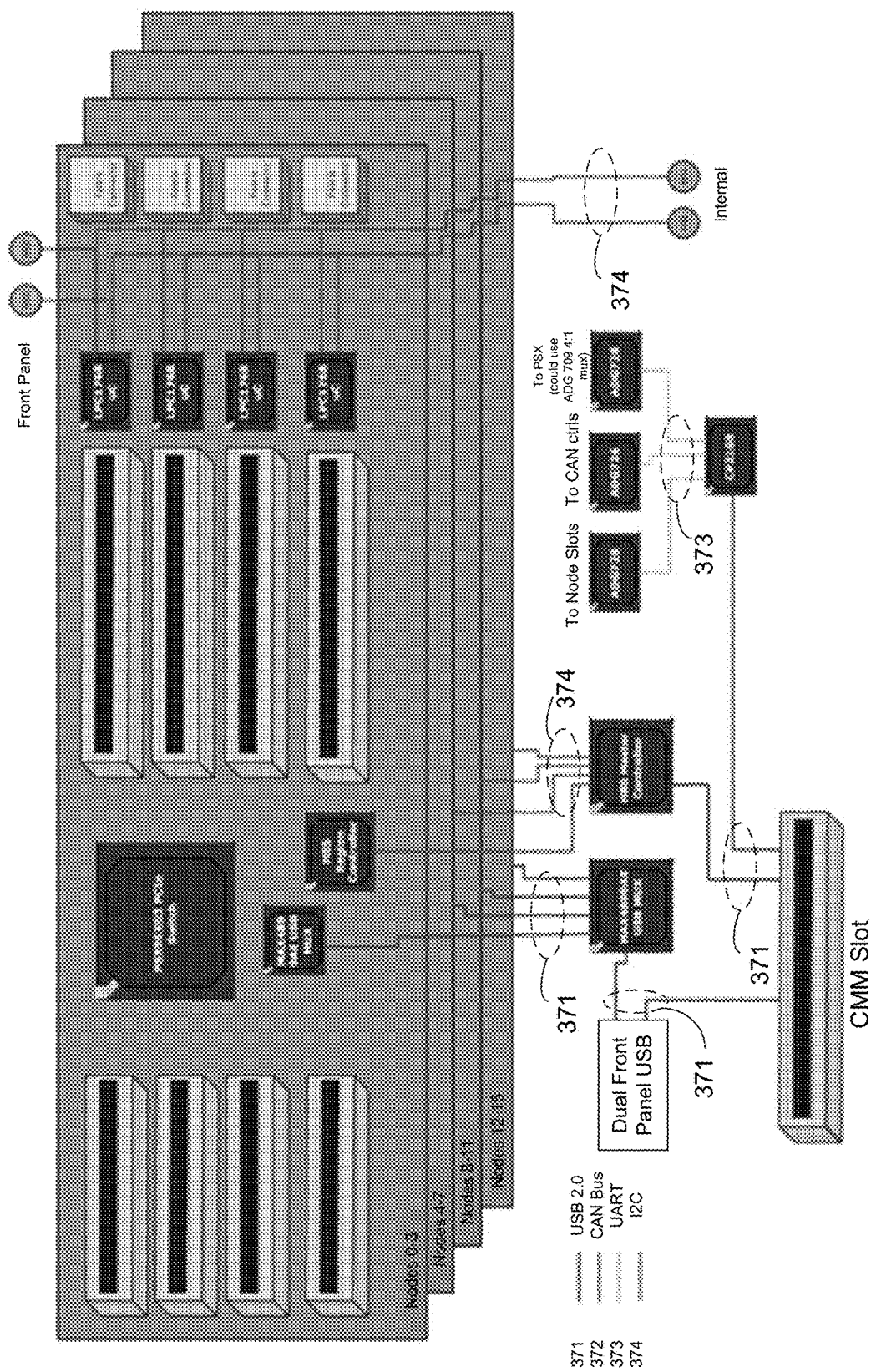

The aforementioned configurations/connections are shown in FIG. 3D, which illustrates components of microcluster data plane slices, according to some embodiments. As shown in FIG. 3D, each board/slice includes a region controller and various USB, CAN bus, UART, and I2C connections between various components to facilitate communication.

Figure 4:
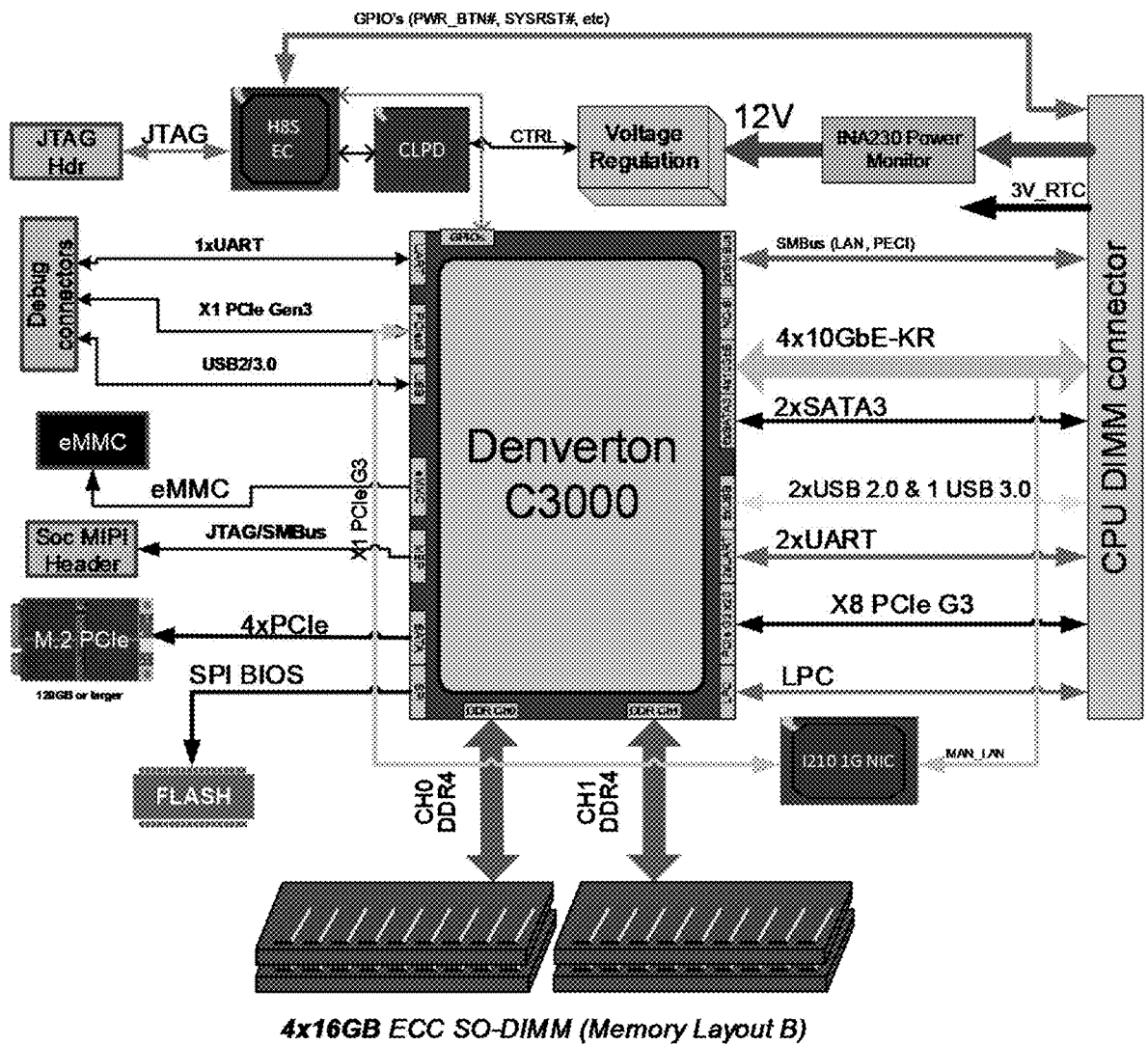
FIGS. 4 and 5 illustrate compute node block diagrams for HCA, according to some embodiments.

FIG. 4 illustrates a Denverton compute node block diagram for HCA, according to an embodiment. The Denverton node is designed for automotive workloads characterization. This SOC can be applied to automotive products and can be a part of partial automation or highly-automated driving functions such as Highway Autopilot (where a vehicle traverses a highway autonomously). In the illustrate embodiment, the Denverton NS CPUs are used. Various components are shown including the CPU module card (e.g., hosting the Denverton C3000 SOC), the memory interfaces, DIMM (Dual In-Line Memory Module) connector to the micro-cluster and rest of interfaces, as discussed with reference to the compute nodes of previous figures.

Figure 5:
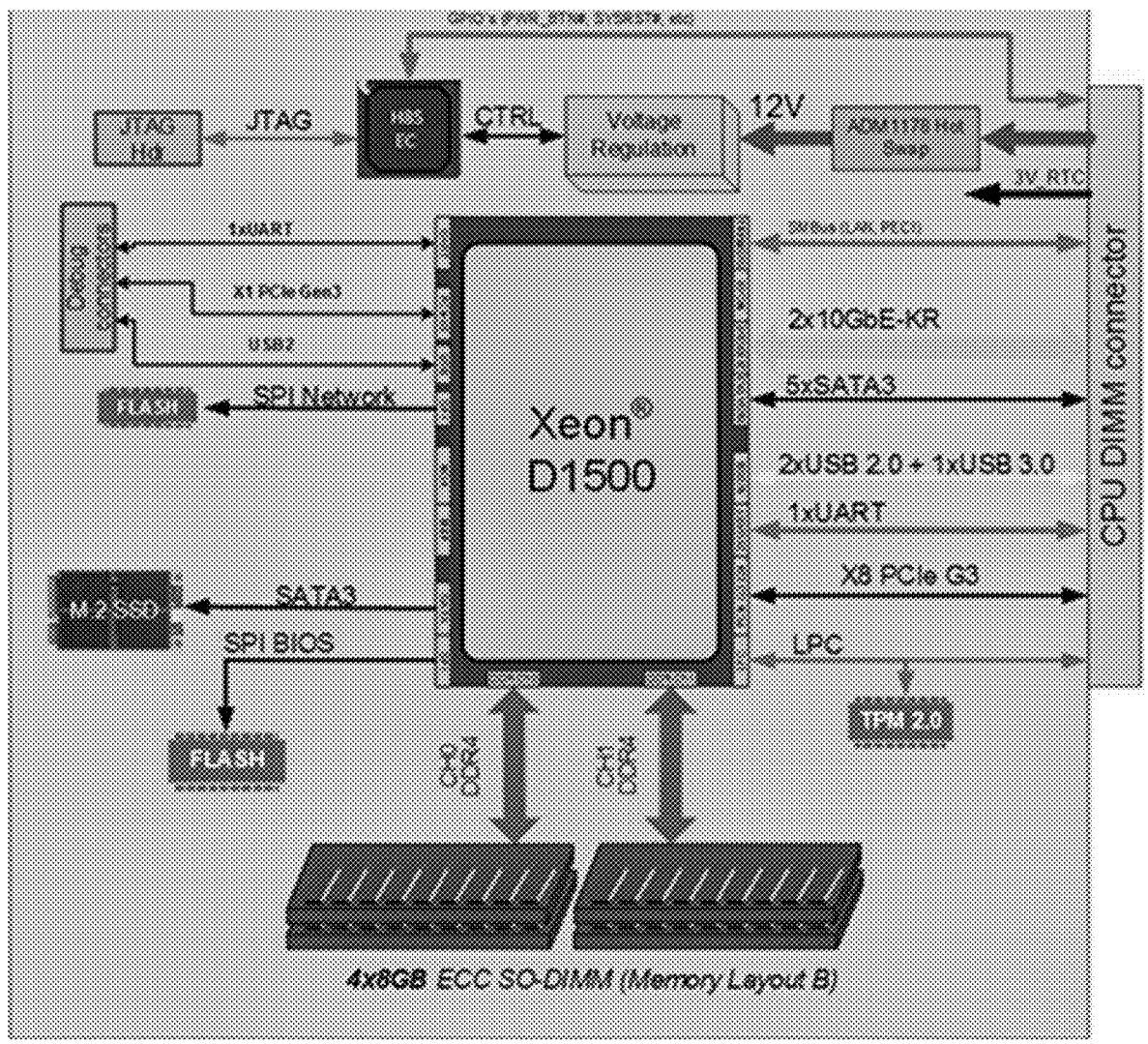

FIG. 5 illustrates a Broadwell-DE CPU compute node block diagram for HCA, according to an embodiment. The Broadwell Node is based on the Xeon D1500 also known as Broadwell-DE. It is similar to the Denverton node of FIG. 4 in design to help in comparison benchmarking. Various components are shown in FIG. 5 including the CPU module card (e.g., hosting the Broadwell-DE CPU), the memory interfaces, DIMM connector to the micro-cluster and rest of interfaces, as discussed with reference to the compute nodes of previous figures. In FIGS. 4 and 5, a JTAG (Joint Test Action Group (developer of IEEE Standard 1149.1-1990)) may be used to verifying designs and testing printed circuit boards after manufacture.

Figure 6:
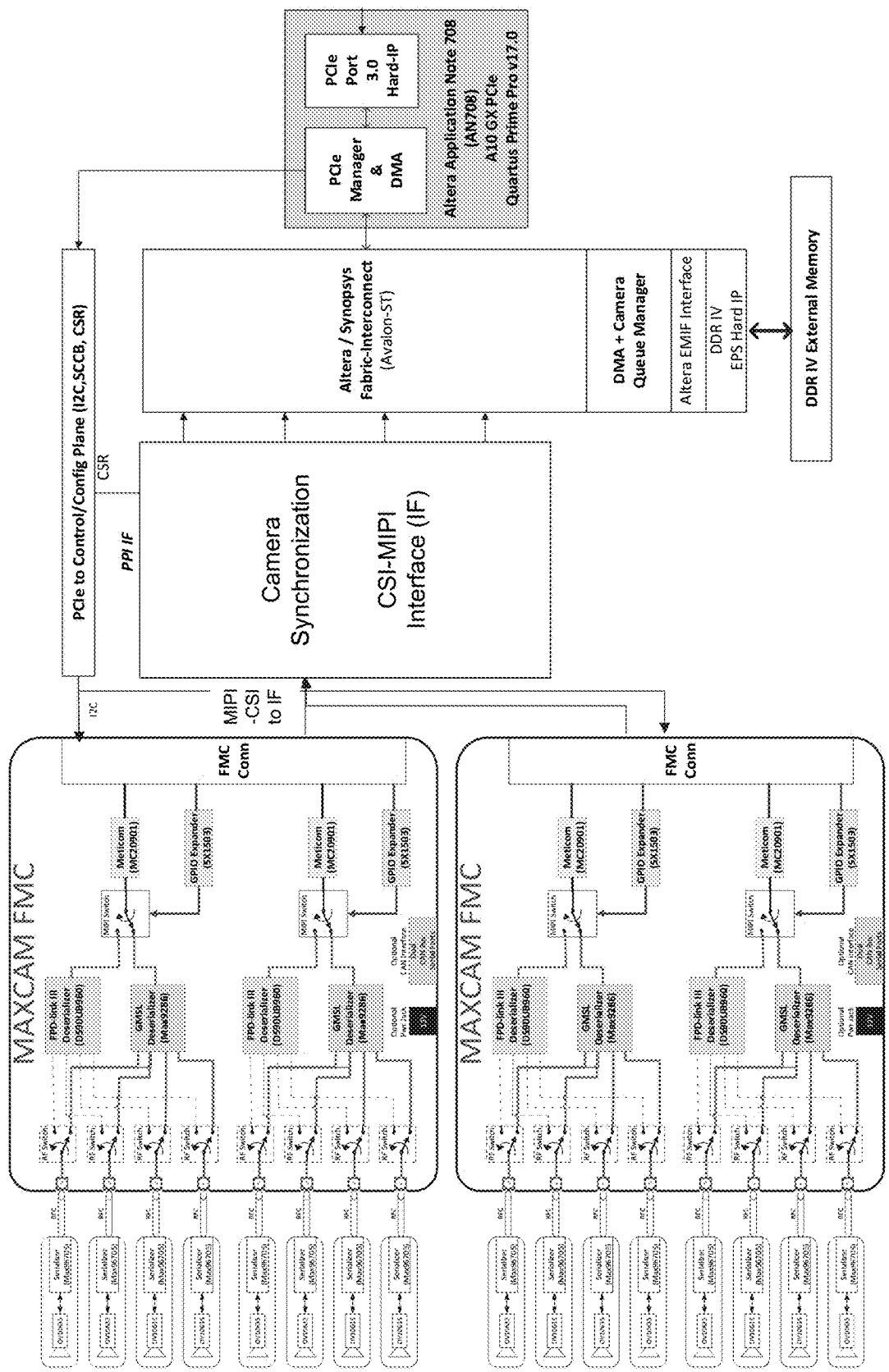
FIG. 6 illustrates a block diagram of a scalable data ingestion FPGA compute node for HCA, according to an embodiment.

FIG. 6 illustrates a block diagram of a scalable data ingestion FPGA compute node for HCA, according to an embodiment. More particularly, FIG. 6 shows an FPGA compute node for acceleration of data ingestion that carries the function of multi sensor data synchronization and preprocessing. This compute node is programmable via PCIe interface from the compute node (CPU) that it is associated to as well as from the management module (e.g., CMM). As shown, camera synchronization may be done via a CSI-MIPI interface. And, PCIe may be used to control/configure the sensor plane via I2C, SCCB (Serial Camera Control Bus), CSR (Control and Status Register), etc.

Figure 7:
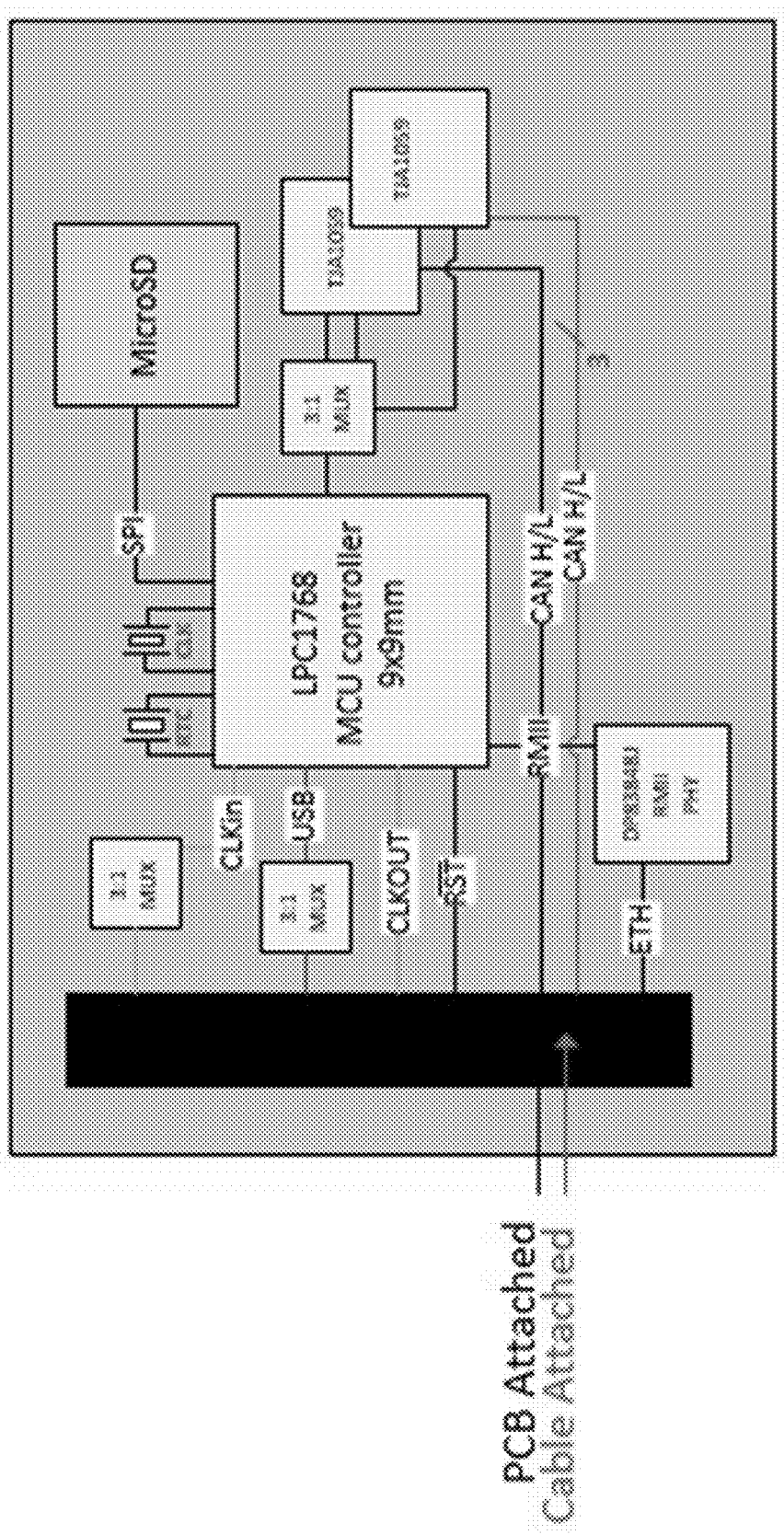
FIG. 7 illustrates a block diagram of an ECU compute node module for HCA, according to an embodiment.

FIG. 7 illustrates a block diagram of an ECU compute node module for HCA, according to an embodiment. The ECU module shown in FIG. 7 may be provided in a stackable configuration (e.g., using LPC family of processors such as discussed previously). The module may also be configured to be a clock master or slave in various embodiments. The ECU compute nodes are programmable MCU microcontrollers with built in JTAG, USB, and CAN connectivity as well as a MicroSD for storage. They can be programmed with an RTOS (Real-Time Operating System) such as AUTOSAR™ ((Automotive Open System Architecture)) software to perform a particular vehicle function e.g. brake control. Multiple modules as displayed in FIG. 7 can be stacked into a carrier board that enables 48 of these units in an embodiment.

To aid with system development of HCA, a workload benchmarking framework may be provided that uses (e.g., Linux®) tools for tracing performance and generating graphs for single or multiple compute nodes. The tools set may make use of vmstat™, blktrace™, tcpdump™ and can be extended with custom debugging/tracing tools. In one embodiment, a configuration file may be provided where the user can modify the parameters for the tools and a launch the file for targeted/distributed monitoring of performance. Once the workload is finished, the tool may allow for gathering of data and visualizations to help analyze bottlenecks and other issues. This data can be then exported to other frameworks as .csv or .png files. For application monitoring, interfaces may be provided with ROS as well as sensor middleware logs.

Figure 8:
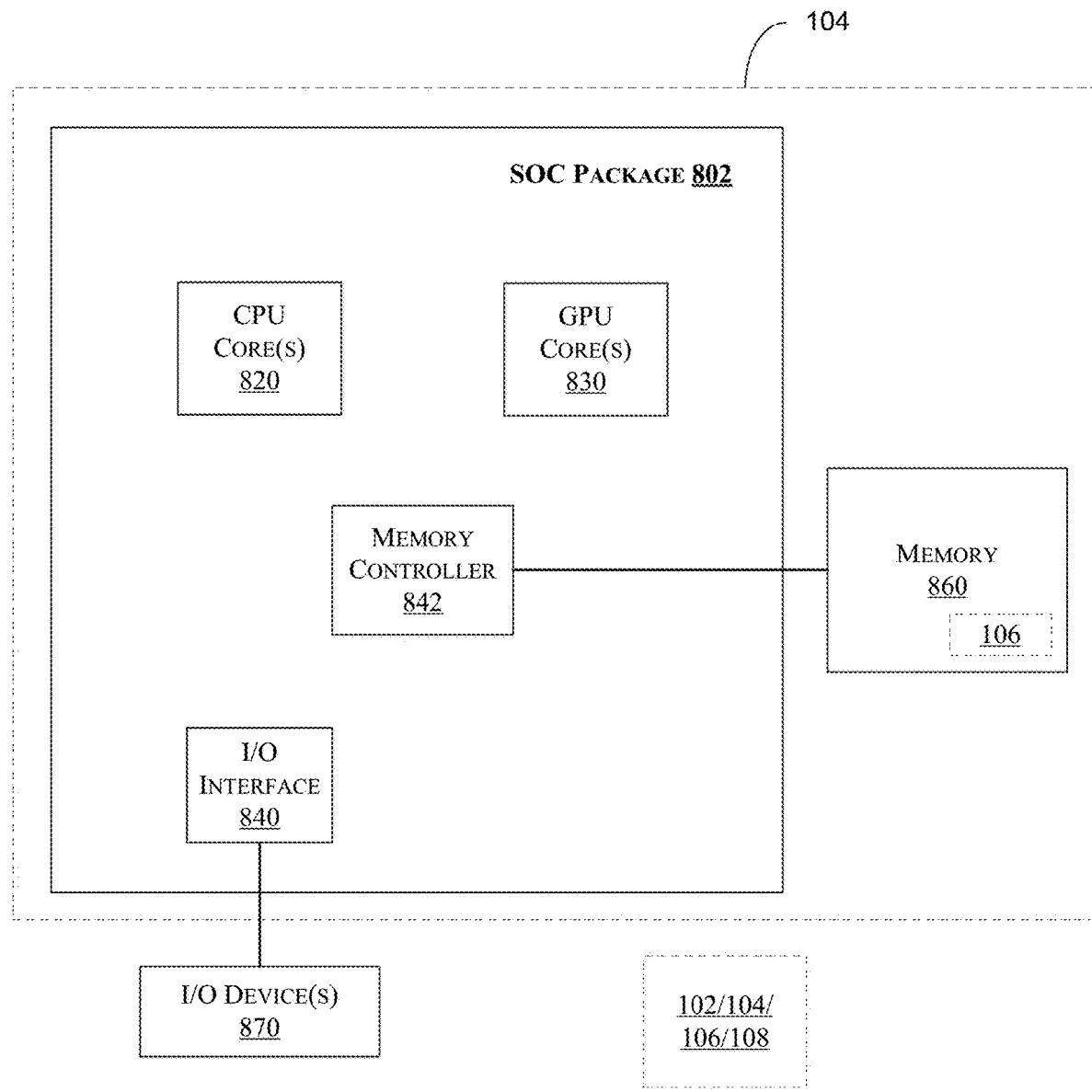
FIGS. 8 and 9 illustrates block diagrams of embodiments of computing systems, which may be utilized in various embodiments discussed herein.

FIG. 8 illustrates a block diagram of an SOC package in accordance with an embodiment. As illustrated in FIG. 8, SOC 802 includes one or more Central Processing Unit (CPU) cores 820, one or more Graphics Processor Unit (GPU) cores 830, an Input/Output (I/O) interface 840, and a memory controller 842. Various components of the SOC package 802 may be coupled to an interconnect or bus such as discussed herein with reference to the other figures. Also, the SOC package 802 may include more or less components, such as those discussed herein with reference to the other figures. Further, each component of the SOC package 820 may include one or more other components, e.g., as discussed with reference to the other figures herein. In one embodiment, SOC package 802 (and its components) is provided on one or more Integrated Circuit (IC) die, e.g., which are packaged into a single semiconductor device.

As illustrated in FIG. 8, SOC package 802 is coupled to a memory 860 via the memory controller 842. In an embodiment, the memory 860 (or a portion of it) can be integrated on the SOC package 802.

The I/O interface 840 may be coupled to one or more I/O devices 870, e.g., via an interconnect and/or bus such as discussed herein with reference to other figures. I/O device(s) 870 may include one or more of a keyboard, a mouse, a touchpad, a display, an image/video capture device (such as a camera or camcorder/video recorder), a touch screen, a speaker, or the like.

Figure 9:
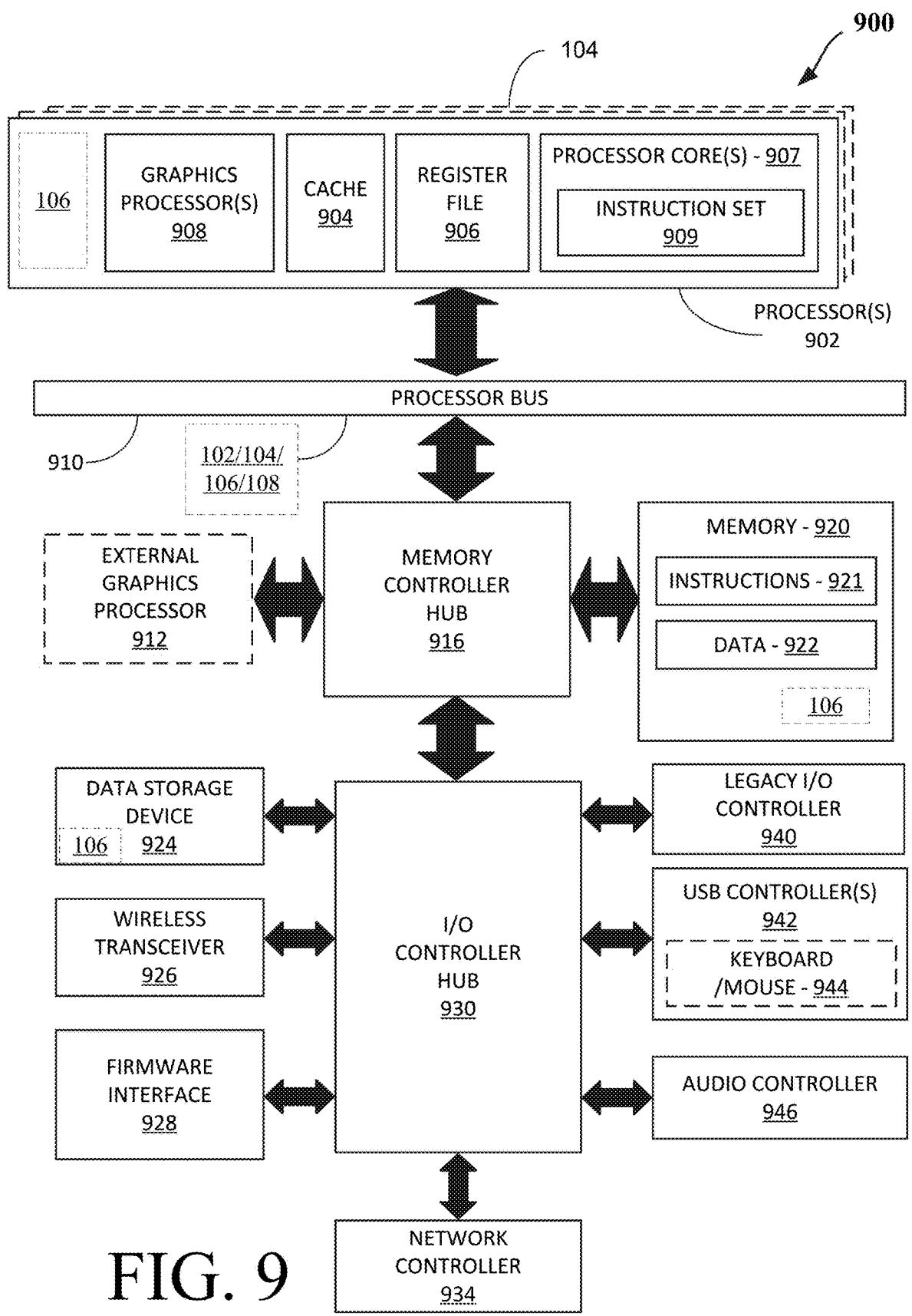

FIG. 9 is a block diagram of a processing system 900, according to an embodiment. In various embodiments the system 900 includes one or more processors 902 and one or more graphics processors 908, and may be a single processor desktop system, a multiprocessor workstation system, or a server system having a large number of processors 902 or processor cores 907. In on embodiment, the system 900 is a processing platform incorporated within a system-on-a-chip (SoC or SOC) integrated circuit for use in mobile, handheld, or embedded devices.

An embodiment of system 900 can include, or be incorporated within a server-based gaming platform, a game console, including a game and media console, a mobile gaming console, a handheld game console, or an online game console. In some embodiments system 900 is a mobile phone, smart phone, tablet computing device or mobile Internet device. Data processing system 900 can also include, couple with, or be integrated within a wearable device, such as a smart watch wearable device, smart eyewear device, augmented reality device, or virtual reality device. In some embodiments, data processing system 900 is a television or set top box device having one or more processors 902 and a graphical interface generated by one or more graphics processors 908.

In some embodiments, the one or more processors 902 each include one or more processor cores 907 to process instructions which, when executed, perform operations for system and user software. In some embodiments, each of the one or more processor cores 907 is configured to process a specific instruction set 909. In some embodiments, instruction set 909 may facilitate Complex Instruction Set Computing (CISC), Reduced Instruction Set Computing (RISC), or computing via a Very Long Instruction Word (VLIW). Multiple processor cores 907 may each process a different instruction set 909, which may include instructions to facilitate the emulation of other instruction sets. Processor core 907 may also include other processing devices, such a Digital Signal Processor (DSP).

In some embodiments, the processor 902 includes cache memory 904. Depending on the architecture, the processor 902 can have a single internal cache or multiple levels of internal cache. In some embodiments, the cache memory is shared among various components of the processor 902. In some embodiments, the processor 902 also uses an external cache (e.g., a Level-3 (L3) cache or Last Level Cache (LLC)) (not shown), which may be shared among processor cores 907 using known cache coherency techniques. A register file 906 is additionally included in processor 902 which may include different types of registers for storing different types of data (e.g., integer registers, floating point registers, status registers, and an instruction pointer register). Some registers may be general-purpose registers, while other registers may be specific to the design of the processor 902.

In some embodiments, processor 902 is coupled to a processor bus 910 to transmit communication signals such as address, data, or control signals between processor 902 and other components in system 900. In one embodiment the system 900 uses an exemplary 'hub' system architecture, including a memory controller hub 916 and an Input Output (I/O) controller hub 930. A memory controller hub 916 facilitates communication between a memory device and other components of system 900, while an I/O Controller Hub (ICH) 930 provides connections to I/O devices via a local I/O bus. In one embodiment, the logic of the memory controller hub 916 is integrated within the processor.

Memory device 920 can be a dynamic random access memory (DRAM) device, a static random access memory (SRAM) device, flash memory device, phase-change memory device, or some other memory device having suitable performance to serve as process memory. In one embodiment the memory device 920 can operate as system memory for the system 900, to store data 922 and instructions 921 for use when the one or more processors 902 executes an application or process. Memory controller hub 916 also couples with an optional external graphics processor 912, which may communicate with the one or more graphics processors 908 in processors 902 to perform graphics and media operations.

In some embodiments, ICH 930 enables peripherals to connect to memory device 920 and processor 902 via a high-speed I/O bus. The I/O peripherals include, but are not limited to, an audio controller 946, a firmware interface 928, a wireless transceiver 926 (e.g., Wi-Fi, Bluetooth), a data storage device 924 (e.g., hard disk drive, flash memory, etc.), and a legacy I/O controller 940 for coupling legacy (e.g., Personal System 2 (PS/2)) devices to the system. One or more Universal Serial Bus (USB) controllers 942 connect input devices, such as keyboard and mouse 944 combinations. A network controller 934 may also couple to ICH 930. In some embodiments, a high-performance network controller (not shown) couples to processor bus 910. It will be appreciated that the system 900 shown is exemplary and not limiting, as other types of data processing systems that are differently configured may also be used. For example, the I/O controller hub 930 may be integrated within the one or more processor 902, or the memory controller hub 916 and I/O controller hub 930 may be integrated into a discreet external graphics processor, such as the external graphics processor 912.

Figure 10:
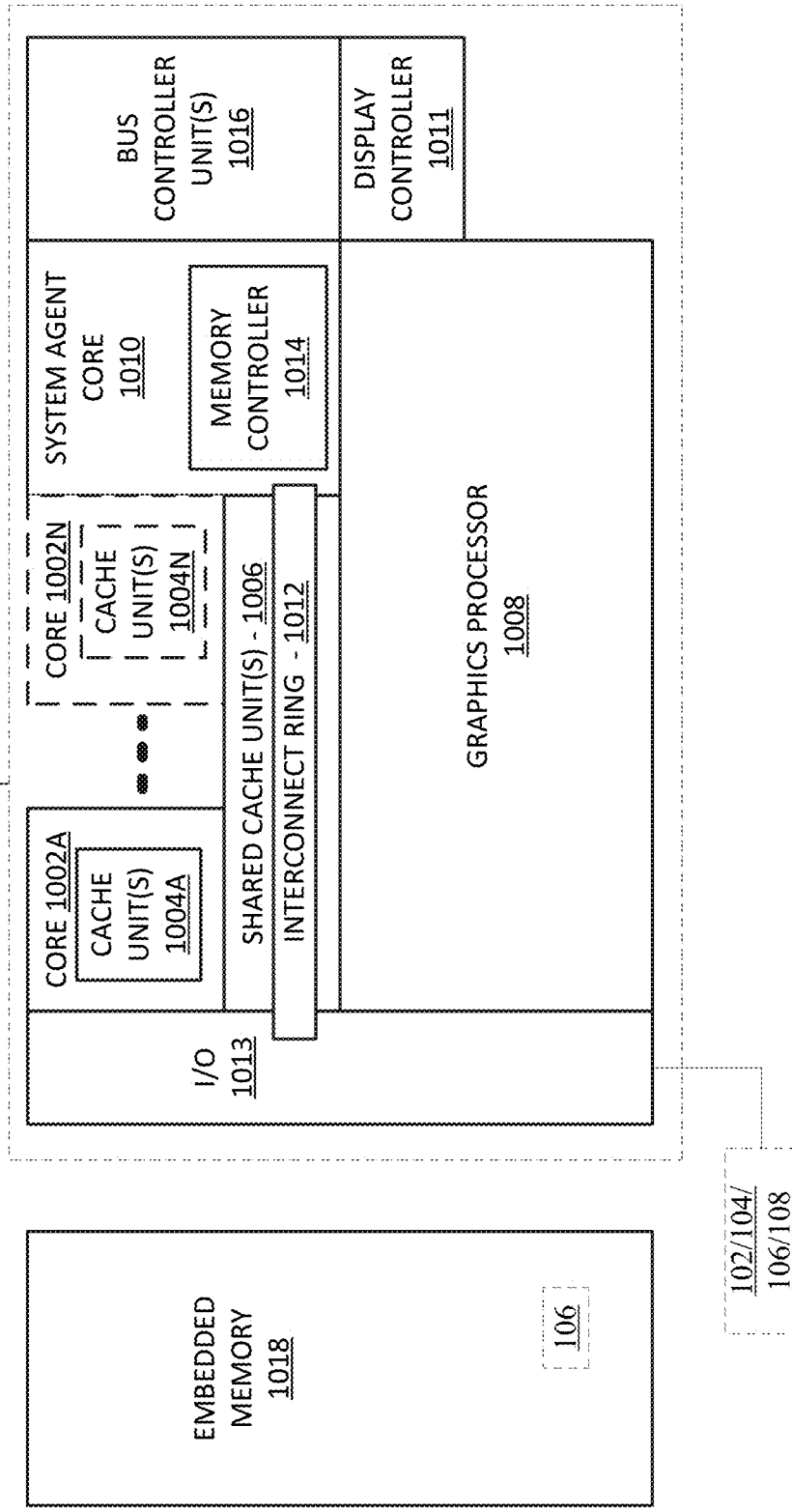
FIGS. 10 and 11 illustrate various components of processers in accordance with some embodiments.

FIG. 10 is a block diagram of an embodiment of a processor 1000 having one or more processor cores 1002A to 1002N, an integrated memory controller 1014, and an integrated graphics processor 1008. Those elements of FIG. 10 having the same reference numbers (or names) as the elements of any other figure herein can operate or function in any manner similar to that described elsewhere herein, but are not limited to such. Processor 1000 can include additional cores and including additional core 1002N represented by the dashed lined boxes. Each of processor cores 1002A to 1002N includes one or more internal cache units 1004A to 1004N. In some embodiments each processor core also has access to one or more shared cached units 1006.

The internal cache units 1004A to 1004N and shared cache units 1006 represent a cache memory hierarchy within the processor 1000. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 1006 and 1004A to 1004N.

In some embodiments, processor 1000 may also include a set of one or more bus controller units 1016 and a system agent core 1010. The one or more bus controller units 1016 manage a set of peripheral buses, such as one or more Peripheral Component Interconnect buses (e.g., PCI, PCI Express). System agent core 1010 provides management functionality for the various processor components. In some embodiments, system agent core 1010 includes one or more integrated memory controllers 1014 to manage access to various external memory devices (not shown).

In some embodiments, one or more of the processor cores 1002A to 1002N include support for simultaneous multi-threading. In such embodiment, the system agent core 1010 includes components for coordinating and operating cores 1002A to 1002N during multi-threaded processing. System agent core 1010 may additionally include a power control unit (PCU), which includes logic and components to regulate the power state of processor cores 1002A to 1002N and graphics processor 1008.

In some embodiments, processor 1000 additionally includes graphics processor 1008 to execute graphics processing operations. In some embodiments, the graphics processor 1008 couples with the set of shared cache units 1006, and the system agent core 1010, including the one or more integrated memory controllers 1014. In some embodiments, a display controller 1011 is coupled with the graphics processor 1008 to drive graphics processor output to one or more coupled displays. In some embodiments, display controller 1011 may be a separate module coupled with the graphics processor via at least one interconnect, or may be integrated within the graphics processor 1008 or system agent core 1010.

In some embodiments, a ring based interconnect unit 1012 is used to couple the internal components of the processor 1000. However, an alternative interconnect unit may be used, such as a point-to-point interconnect, a switched interconnect, or other techniques, including techniques well known in the art. In some embodiments, graphics processor 1008 couples with the ring interconnect 1012 via an I/O link 1013.

The exemplary I/O link 1013 represents at least one of multiple varieties of I/O interconnects, including an on package I/O interconnect which facilitates communication between various processor components and a high-performance embedded memory module 1018, such as an eDRAM (or embedded DRAM) module. In some embodiments, each of the processor cores 1002 to 1002N and graphics processor 1008 use embedded memory modules 1018 as a shared Last Level Cache.

In some embodiments, processor cores 1002A to 1002N are homogenous cores executing the same instruction set architecture. In another embodiment, processor cores 1002A to 1002N are heterogeneous in terms of instruction set architecture (ISA), where one or more of processor cores 1002A to 1002N execute a first instruction set, while at least one of the other cores executes a subset of the first instruction set or a different instruction set. In one embodiment processor cores 1002A to 1002N are heterogeneous in terms of microarchitecture, where one or more cores having a relatively higher power consumption couple with one or more power cores having a lower power consumption. Additionally, processor 1000 can be implemented on one or more chips or as an SoC integrated circuit having the illustrated components, in addition to other components.

Figure 11:
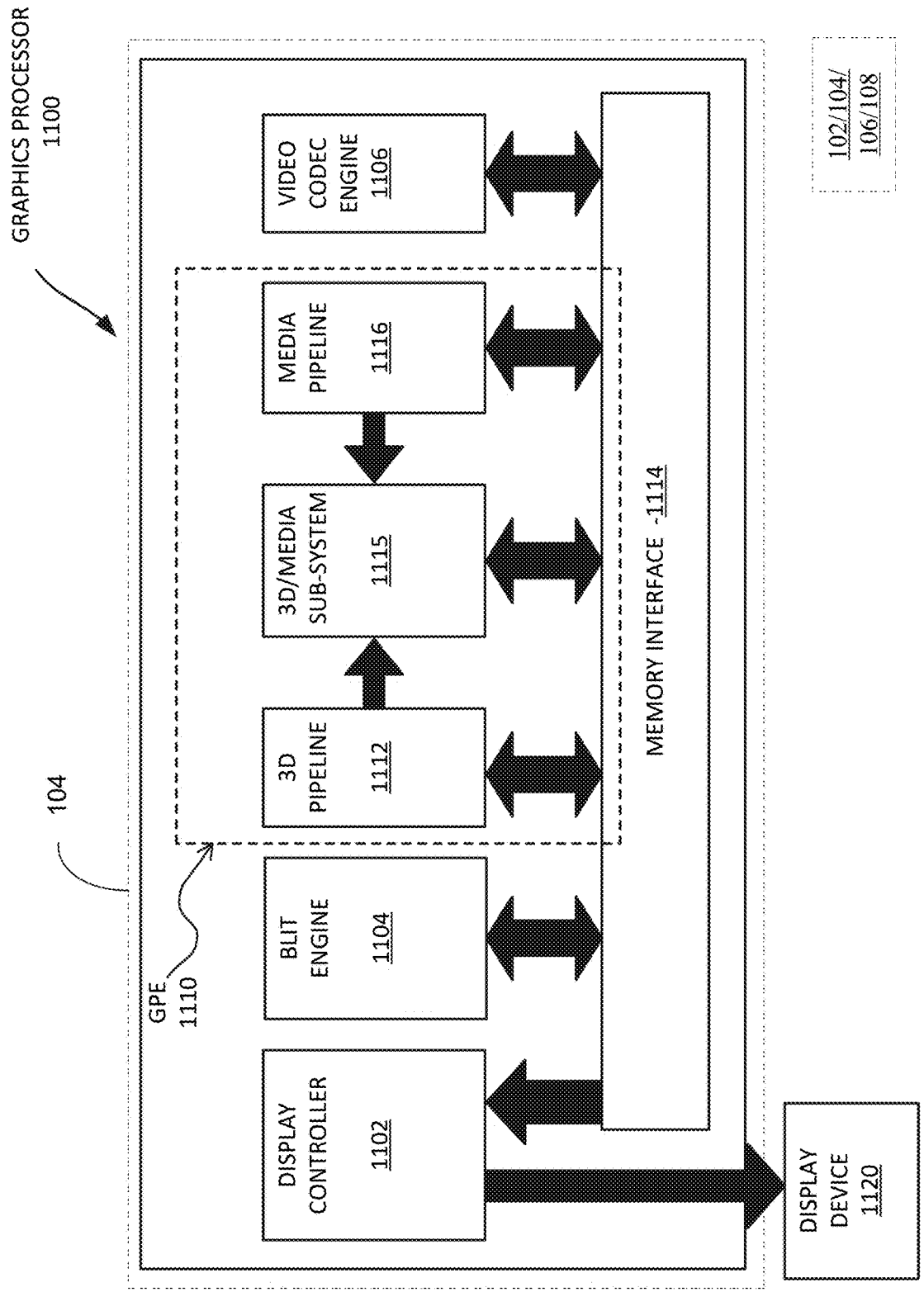

FIG. 11 is a block diagram of a graphics processor 1100, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1100 includes a memory interface 1114 to access memory. Memory interface 1114 can be an interface to local memory, one or more internal caches, one or more shared external caches, and/or to system memory.

In some embodiments, graphics processor 1100 also includes a display controller 1102 to drive display output data to a display device 1120. Display controller 1102 includes hardware for one or more overlay planes for the display and composition of multiple layers of video or user interface elements. In some embodiments, graphics processor 1100 includes a video codec engine 1106 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 1100 includes a block image transfer (BLIT) engine 1104 to perform two-dimensional (2D) rasterizer operations including, for example, bit-boundary block transfers. However, in one embodiment, 11D graphics operations are performed using one or more components of graphics processing engine (GPE) 1110. In some embodiments, graphics processing engine 1110 is a compute engine for performing graphics operations, including three-dimensional (3D) graphics operations and media operations.

In some embodiments, GPE 1110 includes a 3D pipeline 1112 for performing 3D operations, such as rendering three-dimensional images and scenes using processing functions that act upon 3D primitive shapes (e.g., rectangle, triangle, etc.). The 3D pipeline 1112 includes programmable and fixed function elements that perform various tasks within the element and/or spawn execution threads to a 3D/Media sub-system 1115. While 3D pipeline 1112 can be used to perform media operations, an embodiment of GPE 1110 also includes a media pipeline 1116 that is specifically used to perform media operations, such as video post-processing and image enhancement.

In some embodiments, media pipeline 1116 includes fixed function or programmable logic units to perform one or more specialized media operations, such as video decode acceleration, video de-interlacing, and video encode acceleration in place of, or on behalf of video codec engine 1106. In some embodiments, media pipeline 1116 additionally includes a thread spawning unit to spawn threads for execution on 3D/Media sub-system 1115. The spawned threads perform computations for the media operations on one or more graphics execution units included in 3D/Media sub-system 1115.

In some embodiments, 3D/Media subsystem 1115 includes logic for executing threads spawned by 3D pipeline 1112 and media pipeline 1116. In one embodiment, the pipelines send thread execution requests to 3D/Media sub-system 1115, which includes thread dispatch logic for arbitrating and dispatching the various requests to available thread execution resources. The execution resources include an array of graphics execution units to process the 3D and media threads. In some embodiments, 3D/Media subsystem 1115 includes one or more internal caches for thread instructions and data. In some embodiments, the subsystem also includes shared memory, including registers and addressable memory, to share data between threads and to store output data.

The following examples pertain to further embodiments. Example 1 includes an apparatus comprising: a plurality of processors, coupled to a Controller Area Network (CAN) Bus, to communicate with one or more components of a vehicle; and a region controller, coupled to each of the plurality of processors via a point-to-point interconnect, wherein the plurality of processors, the CAN Bus, and the region controller form a first compute module, wherein the region controller is to manage operations of one or more components of the first compute module, wherein the plurality of processors are capable to communicate with each other and one or more other components of the first compute module via a high speed interface, while the plurality of processors are capable to communicate with the one or more vehicle components via the CAN Bus, wherein the high speed interface is to provide faster data communication than the CAN Bus, wherein the region controller is coupled to a Chassis Management Module (CMM), wherein the CMM is capable to control operations of one or more components of the first compute module through the region controller.

Example 2 includes the apparatus of example 1, wherein the one or more vehicle components comprise one or more of: a camera, a LIDAR, a radar, an Inertial Measurement Unit (IMU), or an ultrasonic device. Example 3 includes the apparatus of example 1, wherein the CMM is to: control power consumption of the one or more components of the first compute module and one or more other compute modules; monitor power consumption of the one or more components of the first compute module and the one or more other compute modules; or monitor temperature values for the first compute module and the one or more other compute modules. Example 4 includes the apparatus of example 1, further comprising a master controller, coupled to the region controller of the first compute module and region controller of a second compute module, to manage operations of one or more components of the first compute module and the second compute module. Example 5 includes the apparatus of example 1, further comprising a Peripheral Component Interconnect express (PCIe) switch, coupled to each of the plurality of processors, to facilitate communication between the plurality of processors and one or more PCIe connectors, wherein the one or more PCIe connectors are coupled to one or more of: a Field-Programmable Gate Array (FPGA), a Graphics Processor Unit (GPU), a hardware accelerator or Application Specific Integrated Circuit (ASIC) device, or a different processor.

Example 6 includes the apparatus of example 5, wherein the different processor comprises a different architecture from an architecture of at least one of the plurality of processors. Example 7 includes the apparatus of example 1, wherein the point-to-point interconnect comprises an Ethernet interconnect, Universal Asynchronous Receiver-Transmitter (UART) interface, a Universal Serial Bus (USB), or an Interface to Communicate (I2C) interconnect. Example 8 includes the apparatus of example 1, wherein the plurality of processors, the CAN Bus, and region controller form a first compute module, wherein the first compute module is coupled to one or more other compute modules via a CAN Universal Asynchronous Receiver-Transmitter (UART) multiplexer coupled to the CAN Bus. Example 9 includes the apparatus of example 1, wherein a motherboard comprises the plurality of processors, the CAN Bus, the region controller, and memory.

Example 10 includes the apparatus of example 1, wherein each of the plurality of processors is coupled to the CAN Bus via a serial bus. Example 11 includes the apparatus of example 10, wherein the serial bus comprises a Universal Serial Bus (USB). Example 12 includes the apparatus of example 1, further comprising a plurality of microcontrollers, wherein each of the plurality of processors is coupled to the CAN Bus via one of the plurality of microcontrollers. Example 13 includes the apparatus of example 1, wherein one or more of the plurality of the processors comprise a plurality of processor cores. Example 14 includes the apparatus of example 1, wherein a System On Chip (SOC) device comprises the plurality of processors, the region controller, an interface coupled between the plurality of processors and the CAN Bus, and memory.

Example 15 includes the apparatus of example 1, wherein an Internet of Things (IoT) device or vehicle comprises one or more of: the first compute module and memory. Example 16 includes the apparatus of example 1, wherein a single integrated device comprises one or more of: the plurality of processors, the region controller, and an interface coupled between the plurality of processors and the CAN Bus, and memory. Example 17 includes the apparatus of example 1, wherein the high speed interface comprises an Ethernet interface.

Example 18 includes one or more computer-readable medium comprising one or more instructions that when executed on at least one processor configure the at least one processor to perform one or more operations to: communicate with one or more components of a vehicle via a Controller Area Network (CAN) Bus; and communicate with a region controller via a point-to-point interconnect, wherein the processor, having one or more processor cores, the CAN Bus, and the region controller form a first compute module, wherein the region controller is to manage operations of one or more components of the first compute module, wherein the processor is capable to communicate with a second processor and one or more other components of the first compute module via a high speed interface, while the processor is capable to communicate with the one or more vehicle components via the CAN Bus, wherein the high speed interface is to provide faster data communication than the CAN Bus, wherein the region controller is coupled to a Chassis Management Module (CMM), wherein the CMM is capable to control operations of one or more components of the first compute module through the region controller.

Example 19 includes the one or more computer-readable medium of example 18, wherein the one or more vehicle components comprise one or more of: a camera, a LIDAR, a radar, an Inertial Measurement Unit (IMU), or an ultrasonic device. Example 20 includes the one or more computer-readable medium of example 18, further comprising one or more instructions that when executed on the at least one processor configure the at least one processor to perform one or more operations to cause the CMM to: control power consumption of the one or more components of the first compute module and one or more other compute modules; monitor power consumption of the one or more components of the first compute module and the one or more other compute modules; or monitor temperature values for the first compute module and the one or more other compute modules.

Example 21 includes an apparatus comprising means to perform a method as set forth in any preceding example. Example 22 includes machine-readable storage including machine-readable instructions, when executed, to implement a method or realize an apparatus as set forth in any preceding example.

In various embodiments, the operations discussed herein, e.g., with reference to FIG. 1 et seq., may be implemented as hardware (e.g., logic circuitry or more generally circuitry or circuit), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIG. 1 et seq.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a plurality of processors, coupled to a Controller Area Network (CAN) Bus, to communicate with one or more components of a vehicle; and
a region controller, coupled to each of the plurality of processors via a point-to-point interconnect,
wherein the plurality of processors, the CAN Bus, and the region controller form a first compute module, wherein the region controller is to manage operations of one or more components of the first compute module,
wherein the plurality of processors are capable to communicate with each other and one or more other components of the first compute module via a high speed interface, while the plurality of processors are capable to communicate with the one or more vehicle components via the CAN Bus, wherein the high speed interface is to provide faster data communication than the CAN Bus, wherein a master controller, coupled to the region controller of the first compute module and region controller of a second compute module, to manage operations of one or more components of the first compute module and the second compute module, wherein the master controller is capable to allow for comparison of at least one component of the first compute module and at least one component of the second compute module.

2. The apparatus of claim 1, wherein the one or more vehicle components comprise one or more of: a camera, a LIDAR, a radar, an Inertial Measurement Unit (IMU), or an ultrasonic device.

3. The apparatus of claim 1, wherein the region controller is coupled to a Chassis Management Module (CMM), wherein the CMM is to:

control power consumption of the one or more components of the first compute module and one or more other compute modules;
monitor power consumption of the one or more components of the first compute module and the one or more other compute modules; or
monitor temperature values for the first compute module and the one or more other compute modules.

4. The apparatus of claim 1, further comprising a Peripheral Component Interconnect express (PCIe) switch, coupled to each of the plurality of processors, to facilitate communication between the plurality of processors and one or more PCIe connectors, wherein the one or more PCIe connectors are coupled to one or more of: a Field-Programmable Gate Array (FPGA), a Graphics Processor Unit (GPU), a hardware accelerator or Application Specific Integrated Circuit (ASIC) device, or a different processor.

5. The apparatus of claim 4, wherein the different processor comprises a different architecture from an architecture of at least one of the plurality of processors.

6. The apparatus of claim 1, wherein the point-to-point interconnect comprises an Ethernet interconnect, Universal Asynchronous Receiver-Transmitter (UART) interface, a Universal Serial Bus (USB), or an Interface to Communicate (I2C) interconnect.

7. The apparatus of claim 1, wherein the plurality of processors, the CAN Bus, and region controller form a first compute module, wherein the first compute module is coupled to one or more other compute modules via a CAN Universal Asynchronous Receiver-Transmitter (UART) multiplexer coupled to the CAN Bus.

8. The apparatus of claim 1, wherein a motherboard comprises an SOC device, wherein the SOC device comprises one or more of: the plurality of processors, the region controller, an interface coupled between the plurality of processors and the CAN Bus, and the memory.

9. The apparatus of claim 1, wherein each of the plurality of processors is coupled to the CAN Bus via a serial bus.

10. The apparatus of claim 9, wherein the serial bus comprises a Universal Serial Bus (USB).

11. The apparatus of claim 1, further comprising a plurality of microcontrollers, wherein each of the plurality of processors is coupled to the CAN Bus via one of the plurality of microcontrollers.

12. The apparatus of claim 1, wherein one or more of the plurality of the processors comprise a plurality of processor cores.

13. The apparatus of claim 1, wherein an Internet of Things (IoT) device or a vehicle comprises an SOC device, wherein the SOC device comprises one or more of: the plurality of processors, the region controller, an interface coupled between the plurality of processors and the CAN Bus, and the memory.

14. The apparatus of claim 1, wherein the high speed interface comprises an Ethernet interface.

15. One or more non-transitory computer-readable medium comprising one or more instructions that when executed on at least one processor configure the at least one processor to perform one or more operations to:
communicate with one or more components of a vehicle via a Controller Area Network (CAN) Bus; and
communicate with a region controller via a point-to-point interconnect,
wherein the processor, having one or more processor cores, the CAN Bus, and the region controller form a first compute module, wherein the region controller is to manage operations of one or more components of the first compute module, wherein the processor is capable to communicate with a second processor and one or more other components of the first compute module via a high speed interface, while the processor is capable to communicate with the one or more vehicle components via the CAN Bus, wherein the high speed interface is to provide faster data communication than the CAN Bus, wherein a master controller, coupled to the region controller of the first compute module and region controller of a second compute module, to manage operations of one or more components of the first compute module and the second compute module, wherein the master controller is capable to allow for comparison of at least one component of the first compute module and at least one component of the second compute module.

16. The one or more non-transitory computer-readable medium of claim 15, wherein the one or more vehicle components comprise one or more of: a camera, a LIDAR, a radar, an Inertial Measurement Unit (IMU), or an ultrasonic device.

17. The one or more non-transitory computer-readable medium of claim 15, further comprising one or more instructions that when executed on the at least one processor configure the at least one processor to perform one or more operations to cause a Chassis Management Module (CMM) to:

control power consumption of the one or more components of the first compute module and one or more other compute modules;

monitor power consumption of the one or more components of the first compute module and the one or more other compute modules; or monitor temperature values for the first compute module and the one or more other compute modules.

18. The apparatus of claim 1, wherein the region controller is coupled to a Chassis Management Module (CMM), wherein the CMM is capable to control operations of one or more components of the first compute module through the region controller.

19. The apparatus of claim 1, wherein a single integrated device comprises the plurality of processors, the region controller, and an interface coupled between the plurality of processors and the CAN Bus, and a memory.

* * * * *